United States Patent [19]
Syverson

[11] 3,709,408
[45] Jan. 9, 1973

[54] BEVERAGE DISPENSING MACHINE

[75] Inventor: Martelle J. Syverson, Albert Lea, Minn.

[73] Assignee: Fountain Industries, Inc., Albert Lea, Minn.

[22] Filed: Nov. 25, 1970

[21] Appl. No.: 92,722

[52] U.S. Cl. ............................ 222/129.4, 222/145
[51] Int. Cl. ........................................... B67d 5/56
[58] Field of Search..... 222/129.1, 129.3, 129.4, 132, 222/135, 137, 145

[56] References Cited

UNITED STATES PATENTS

| | | | |
|---|---|---|---|
| 2,843,293 | 6/1958 | Burgogne | 222/129.4 |
| 3,133,675 | 5/1964 | Broadhurst | 222/129.1 |
| 3,300,094 | 1/1967 | Rockola | 222/129.4 |
| 2,977,026 | 3/1967 | Delgado | 222/129.4 |
| 3,268,119 | 8/1966 | Kopera | 222/132 X |

*Primary Examiner*—Robert B. Reeves
*Assistant Examiner*—Larry Martin
*Attorney*—Zarley, McKee & Thomte

[57] ABSTRACT

A machine for dispensing hot beverages including a dry product dispenser having a metering scoop reciprocal for feeding into a mixing chamber also receiving hot water. An exhaust system is in communication with the mixing chamber and draws air through an opening in the scoop when it is in its open position and draws vapor from the hot water conduit and mixing chamber thereby maintaining the dry product in the product dispenser in a dry condition. A pair of mixing chambers are provided having outlet openings registering with a common opening in a lower support housing and different dry product dispensers are provided to feed into the separate mixing chambers. The side walls of each mixing chamber converge at the outlet opening. A passageway is provided under the mixing chamber and extends upward over the forward end thereof to provide communication between the mixing chamber and the exhaust system.

8 Claims, 4 Drawing Figures

PATENTED JAN 9 1973
3,709,408
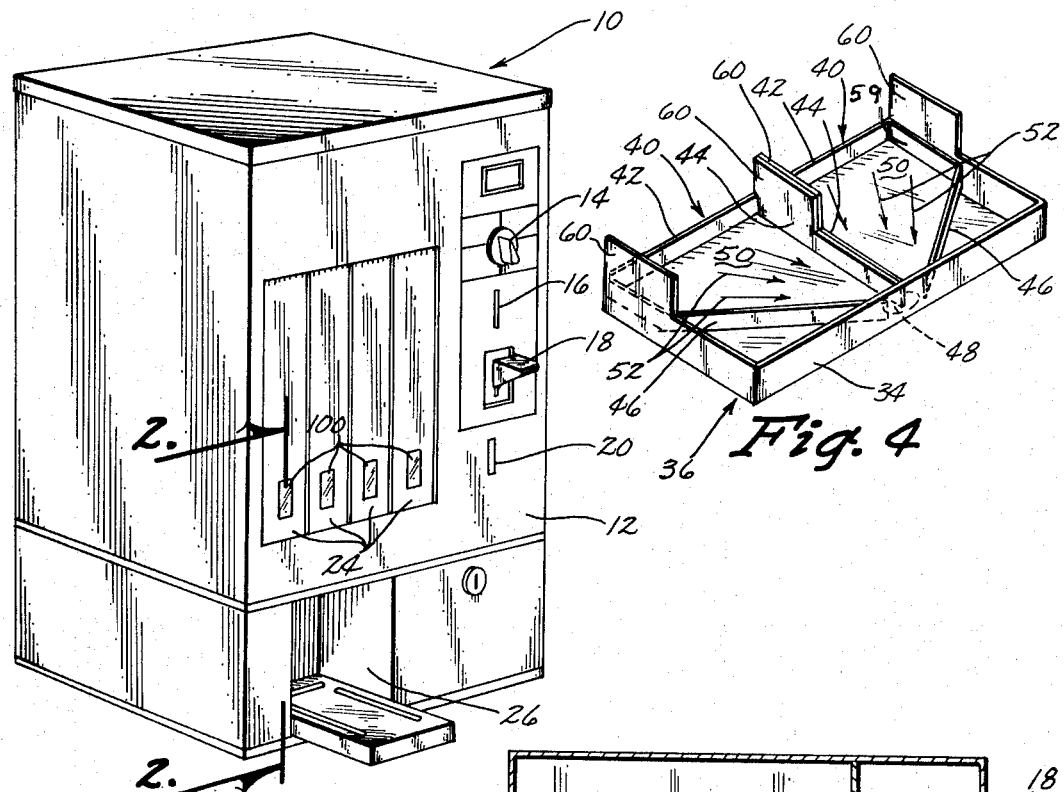
Fig. 4
Fig. 1
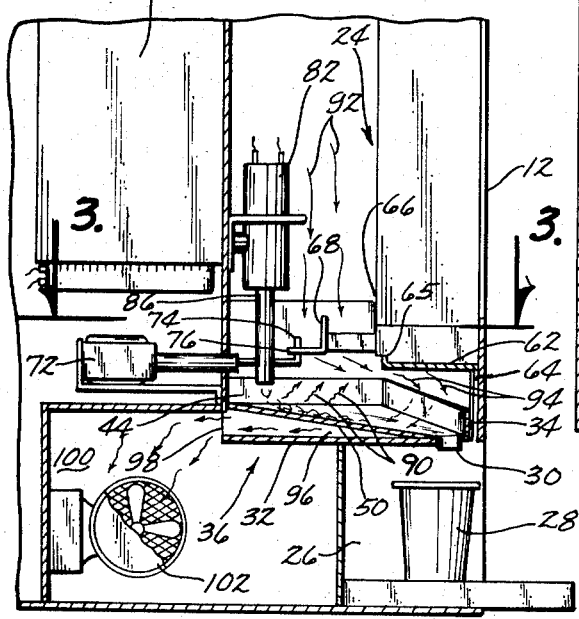
Fig. 2
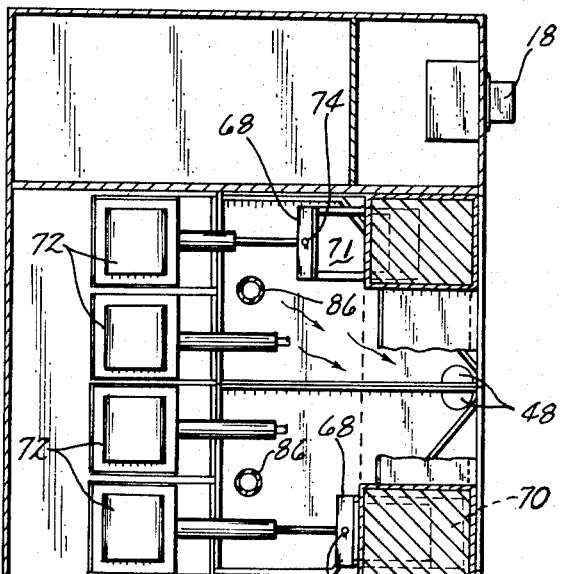
Fig. 3
INVENTOR
MARTELLE J. SYVERSON
BY
Zarley, McKee & Thomte
ATTORNEYS

BEVERAGE DISPENSING MACHINE

In offices, factories and homes it is desirable to have a simplified inexpensive hot beverage dispensing machine which will dispense a dry food concentrate and mix it with hot water. Freeze dry food concentrates have made it possible to dispense a wide variety of foods and drinks.

A common problem with dry product dispensers is produced through water vapors entering the dispenser and solidifying the dry product preventing dry product from being scooped or metered therefrom.

The dispensing machine of this invention provides for the metering of a dry food concentrate into a mixing chamber with hot water in a manner that none of the water vapors ever contact the dispenser scoop or enter the interior of the dispenser even though the hot water outlet and the scoop and opening into the dispenser are in very close proximity to each other over the mixing chamber. The exhaust outlet is at the rear of the mixing chamber and communicates with a passageway under the mixing chamber, upwardly over the forward side thereof such that water vapors are drawn downwardly and forwardly thence rearwardly under the mixing chamber to the exhaust outlet. The air in and above the mixing chamber is thus controlled in its movement such that moisture vapors do not contact the dispenser metering scoop or the interior of the dispenser to contaminate the dry food concentrate.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a perspective view of a dispensing machine;

FIG. 2 is a cross sectional view taken along line 2—2 in FIG. 1;

FIG. 3 is a cross sectional view taken along line 3—3 in FIG. 2; and

FIG. 4 is a perspective view of the mixing chamber and support housing only.

The dispensing machine of this invention is referred to generally in FIG. 1 by the reference numeral 10 and includes a front panel 12 having a four position selector switch 14 and a coin slot 16. A coin actuating lever 18 is provided along with a coin return slot 20. The machine 10 includes four freeze dry product cartridge dispensers 24 having different food products therein such as coffee, tea, beef broth and chicken broth. A cup well 26 is provided to receive a cup 28 which is fed by an outlet opening 30 in the center of the bottom wall 32 adjacent a forward wall 34 of a mixing chamber support housing 36.

A pair of mirror image mixing chambers 40 are positioned in the housing 36 and include rear walls 42 and parallel adjacent side walls 44 which merge with opposite converging side walls 46 at outlet openings 48 in communication with the outlet conduit 30 in the bottom housing wall 32. Each of the mixing chambers 40 include bottom walls 50 which slope towards the outlet openings 48 as indicated by the arrows 52 in FIG. 4. Each of the converging mixing chamber side walls 46 merge into rearwardly extending parallel wall portions 59.

A product dispenser support plate 62 rests on upstanding wall portions 60 and extends across the front top half of the housing 36 and the mixing chambers 40 and includes a downwardly extending flange 64 on the forward side between the panel 12 and the front housing wall 34. An upstanding flange 65 engages the bottom vertical face 66 of the product cartridges 24 having a metering scoop 68 reciprocally received therein. An aggitation element 70 on the inner end of the scoop 68 maintained inside the cartridges causes the dry product to flow from the dispenser cartridges and down through an opening 71 in the scoop to be received in the mixing chambers 50. A solenoid 72 is detachably connected by a pin 74 to a tab 76 on the scoop 68.

A hot water container 80 includes two solenoid valves 82 for feeding hot water into each of the mixing chambers 42 through outlet conduits 86 feeding hot water into the mixing chambers 40.

It is seen in FIG. 2 that hot water fed into the mixing chambers 40 creates steam vapor indicated by the arrows 90 which tends to rise upwardly around the cartridge scoop 68 directly thereabove, however, fresh air, indicated by the arrows 92, is drawn downwardly through the scoop 68 and is mixed with the vapor 90 below the scoop and as indicated by the arrows 94, moves over the converging side walls 46 of the mixing chambers 40 to flow through a passageway 96 formed by the bottom wall 50 and the housing wall 32, which is in communication with an exhaust outlet opening 98 in exhaust fan chamber 100 including an exhaust fan 102 which is continuously operated.

Thus it is seen in operation that a cup 28 is placed in the cup well 26 and an appropriate coin is inserted into the coin slot 16. The selector 14 is turned to one of the four quadrants for operation of one of the four solenoids 72 separately connected to the four freeze dry product cartridge scoops 68. Tea and coffee may be mixed in one of the mixing chamber 40 while beef broth and chicken broth may be mixed in the other mixing chamber. Actuation of the lever 18 will cause a selected solenoid 72 to be operated thus dispensing a predetermined quantity of freeze dry product into the appropriate mixing chamber 40 while simultaneously hot water is dispensed into the mixing chamber until the cup 28 has been filled to the desired level at which time the lever 18 is released and the electrical circuits through the water solenoid 82 and the metering scoop solenoid 72 are deactivated. The simultaneous feeding of hot water and dry product into the mixing chambers 40 causes the mixture to go into solution immediately and the sloping bottom wall 50 of the mixing chambers direct the solution to the outlet 30 for filling the cup 28.

Upon the freeze dry product cartridges 24 becoming empty they may be easily replaced with new filled product cartridges upon removal of the front housing panel 12 and lifting the cartridges 24 off of the upstanding finger 74 on the solenoid 72 and disengaging the base of the cartridges from the support plate 62 having the upstanding flange 65. The windows 100 in the product cartridges 24 indicate visually the quantity of product remaining in the cartridges.

I claim:

1. A beverage dispensing machine comprising,
   a housing including a hot liquid supply outlet and a dry product dispenser adapted to feed into a common mixing chamber, and said mixing chamber having an outlet opening;

said dry product dispenser including a scoop extending through an opening in said dispenser and being moveable between open and closed positions such that when moved to an open position dry product is dispensed into said mixing chamber and during movement to said open position said mixing chamber is in communication with said scoop and the interior of said product dispenser, an exhaust system having a gas exhaust opening positioned such that liquid vapors from said hot liquid outlet opening and said mixing chamber are drawn therefrom without contacting said scoop and communicating with the interior of said dry product dispenser, said hot liquid outlet opening and said exhaust openings being below the bottom plane of said scoop and dispenser opening, the source of air in said mixing chamber being such that when said scoop is in said open position air is drawn down around said scoop and mixed therebelow with said liquid vapors, said mixing chamber being positioned in a support housing and a passageway being formed between said support housing and the bottom exterior of said mixing chamber, and said passageway providing communication between said mixing chamber and said gas exhaust opening, said support housing including a front wall and said mixing chamber including side walls which converge at said outlet opening adjacent said front wall and said passageway extends vertically along one of said sidewalls, a second mixing chamber the mirror image of said first mixing chamber being provided and said housing bottom wall including a common opening in registry with first and second mixing chamber outlets, and said exhaust opening being in communication with said second mixing chamber.

2. The structure of claim 1 wherein said scoop includes a substantial opening extending therethrough through which air may be drawn when said scoop is in said open position.

3. The structure of claim 1 wherein the bottom walls of said first and second mixing chambers slope towards said outlet openings.

4. The structure of claim 3 wherein a second dry product dispenser similar to said first dispenser is provided and is adapted to feed said second mixing chamber and a second hot liquid supply outlet is in communication with said second mixing chamber.

5. The structure of claim 4 wherein said housing includes a front wall and said first and second product dispensers are positioned adjacent said front wall whereby said scoops are moveable toward said open position, by moving away from said front wall.

6. A beverage dispensing machine comprising, a housing including a hot liquid supply outlet and a dry product dispenser adapted to feed into a common mixing chamber, and said mixing chamber having an outlet opening, an exhaust system having a gas exhaust opening positioned such that liquid vapors from said hot liquid outlet opening and said mixing chamber are drawn therefrom without communicating with the interior of said dry product dispenser, said mixing chamber being positioned in a support housing and a passageway being formed between said support housing and the bottom exterior of said mixing chamber, and said passageway providing communication between said mixing chamber and said gas exhaust opening, said support housing including a front wall and said mixing chamber including side walls which converge at said outlet opening adjacent said front wall and said passageway extends vertically along one of said side walls, a second mixing chamber the mirror image of said first mixing chamber being provided and said housing bottom wall including a common opening in registry with first and second mixing chamber outlets, and said exhaust opening being in communication with said second mixing chamber.

7. The structure of claim 5 wherein the bottom walls of said first and second mixing chambers slope towards said outlet openings and said chamber outlet openings are closely adjacent each other and are vertically aligned over an outlet opening in said bottom wall of said support housing within which said chamber outlet openings communicate.

8. The structure of claim 6 wherein a second dry product dispenser similar to said first dispenser is provided and is adapted to feed said second mixing chamber and a second hot liquid supply outlet is in communication with said second mixing chamber.

* * * * *